(12) United States Patent
Ambrazas et al.

(10) Patent No.: US 10,787,954 B2
(45) Date of Patent: Sep. 29, 2020

(54) ELLIPTICALLY-SHAPED COMBUSTION CHAMBER

(71) Applicant: IFP Energies nouvelles, Rueil-Malmaison (FR)

(72) Inventors: Didier Ambrazas, Fresnes (FR); Xavier Gautrot, Rueil-Malmaison (FR); Olivier Laget, Rueil-Malmaison (FR); Julien Trost, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/143,920

(22) Filed: Sep. 27, 2018

(65) Prior Publication Data
US 2019/0101049 A1 Apr. 4, 2019

(30) Foreign Application Priority Data

Sep. 29, 2017 (FR) ..................................... 17 59055

(51) Int. Cl.
*F02B 23/10* (2006.01)
*F02F 1/18* (2006.01)
(Continued)

(52) U.S. Cl.
CPC ............ *F02B 23/104* (2013.01); *F02B 23/08* (2013.01); *F02D 13/0269* (2013.01);
(Continued)

(58) Field of Classification Search
CPC .. F02B 23/104; F02B 23/08; F02B 2023/106; F02B 2275/32; F02B 2023/102;
(Continued)

(56) References Cited

U.S. PATENT DOCUMENTS

| 4,256,068 A * | 3/1981 | Irimajiri | F01L 1/18 |
| | | | 123/193.6 |
| 4,671,228 A * | 6/1987 | Tomita | F01L 1/265 |
| | | | 123/193.4 |

(Continued)

FOREIGN PATENT DOCUMENTS

| DE | 3019330 A1 | 11/1981 | |
| DE | 4030920 A1 * | 4/1991 | ............... F01L 3/06 |
| EP | 0945604 A1 | 9/1999 | |

OTHER PUBLICATIONS

Preliminary Search Report and Annex for FR 1759055 dated Dec. 15, 2017.

*Primary Examiner* — Joseph J Dallo
*Assistant Examiner* — Kurt Philip Liethen
(74) *Attorney, Agent, or Firm* — Fitch, Even, Tabin & Flannery, LLP

(57) ABSTRACT

The present invention relates to a combustion chamber of a combustion engine. The combustion chamber comprises a single intake valve (2), a single exhaust valve (3), a fuel injector (5) and two plugs (4). According to the invention, the combustion chamber is substantially elliptical (6) and the components of the combustion chamber are arranged as follows:

valves (2, 3) are located at the ends of the major axis (8) of ellipse (6),
plugs (4) are located close to the minor axis (9) of ellipse (6),
fuel injector (5) is located on the periphery of ellipse (6) between intake valve (2) and a plug (4).

14 Claims, 3 Drawing Sheets

(51) Int. Cl.
    *F02F 1/24*        (2006.01)
    *F02B 23/08*      (2006.01)
    *F02D 13/02*      (2006.01)
    *F02B 75/12*      (2006.01)

(52) U.S. Cl.
    CPC ............. *F02F 1/183* (2013.01); *F02F 1/242* (2013.01); *F02B 2023/085* (2013.01); *F02B 2023/102* (2013.01); *F02B 2023/106* (2013.01); *F02B 2023/108* (2013.01); *F02B 2075/125* (2013.01); *F02B 2275/32* (2013.01); *F02B 2275/40* (2013.01); *F02B 2275/48* (2013.01)

(58) Field of Classification Search
    CPC ............ F02B 2075/125; F02B 2275/48; F02B 2275/40; F02B 2023/108; F02B 2023/085; F02B 31/00; F02B 23/10; F02D 13/0269; F02F 1/242; F02F 1/183
    See application file for complete search history.

(56) References Cited

U.S. PATENT DOCUMENTS

| | | | |
|---|---|---|---|
| 6,076,498 A | 6/2000 | Monnier | |
| 6,267,107 B1* | 7/2001 | Ward | F02B 17/00 123/162 |
| 7,284,524 B2* | 10/2007 | Matas | F02B 23/08 123/193.5 |
| 2005/0241612 A1 | 11/2005 | Ward | |
| 2010/0006067 A1* | 1/2010 | Pagot | F02B 1/04 123/432 |
| 2010/0175673 A1* | 7/2010 | Ward | F01L 1/022 123/661 |

\* cited by examiner

ELLIPTICALLY-SHAPED COMBUSTION CHAMBER

CROSS REFERENCE TO RELATED APPLICATIONS

Reference is made to French Patent Application No. 17/59.055 filed Sep. 29, 2017, to which priority is claimed and which is incorporated herein by reference in its entirety.

FIELD OF THE INVENTION

The present invention relates to the field of internal-combustion engines. In particular, it relates to a combustion chamber of such an engine.

This type of engine generally comprises at least a cylinder, a piston sliding in this cylinder in a reciprocating rectilinear motion, intake means for an oxidizer, burnt gas exhaust means, a combustion chamber and injection means for injecting a fuel directly into the combustion chamber.

Upon design of an engine, the performance, pollutant emission and combustion chamber mechanical strength constraints are increasingly high whereas the means for meeting these constraints may be incompatible.

Thus, performance increase generally leads to an increase in emissions and to higher mechanical stresses.

To overcome these stresses and in order to guarantee low pollutant emissions and satisfactory mechanical strength over the entire engine operating range, using all of the fuel present in the combustion chamber, by an oxidizer comprising for example air at ambient pressure, supercharged air, or a mixture of air (supercharged or not) and of recirculated burnt gas, is of great importance. Indeed, the fuel mixture (oxidizer/fuel) in the combustion chamber needs to be as homogeneous as possible.

Furthermore, in order to ensure good efficiency and combustion rate, it is desirable to have a high turbulence level, and more specifically a high turbulent kinetic energy level upon ignition of the fuel mixture.

There are different techniques for implementing such turbulences, known as swirl (longitudinal motion), tumble (transverse motion), swumble (swirl and tumble) and squish (sudden motion).

Swirl, which is a macroscopic rotating motion of the fuel mixture about an axis collinear to the cylinder axis, is characterized by good motion conservation during the intake process, and more specifically during the rise of the piston. It is an aerodynamic macroscopic motion that is generally used for compression-ignition internal-combustion engines for which it is a good way to homogenize the fuel mixture.

Tumble is also a macroscopic rotating motion of the fuel mixture, but about an axis globally perpendicular to the cylinder axis. It has the specific feature of turning into microscopic aerodynamic motions that create turbulence as the piston rises. It is an aerodynamic macroscopic motion that is generally used for spark-ignition internal-combustion engines for which it is a good way to obtain an acceptable combustion rate. Besides, this motion is quite sensitive to the combustion chamber geometry and to the lift law, in terms of spread as well as maximum lift height.

Swumble is a motion consisting of swirl and tumble. Using swumble allows to benefit from the advantages of the two aerodynamic structures detailed above and thus from excellent homogenization and a better combustion rate, thanks to a higher turbulence level during the intake phase than the levels observed with the best current spark-ignition engines.

Squish is a sudden aerodynamic motion that appears when air is rapidly "expelled" from a dead volume.

BACKGROUND OF THE INVENTION

Various combustion chamber designs have been achieved for implementing these phenomena.

For example, patent US-2005/241,612 describes a direct-injection high-squish combustion chamber whose ignition occurs through at least one plug. However, the layout of the valves, the injector and the plugs is not optimized to promote swumble, in order to improve the engine performances (efficiency and combustion rate).

According to another example, patent PH-2010/000,186 describes a combustion chamber generating squish through a specific shape close to an ellipse. However, for this combustion chamber, fuel injection is not direct, which does not promote swumble and engine performances (efficiency and combustion rate).

To overcome these drawbacks, the present invention relates to a combustion chamber of a combustion engine. The combustion chamber comprises a single intake valve, a single exhaust valve, a fuel injector and two plugs. According to the invention, the combustion chamber is substantially elliptical and the components of the combustion chamber are arranged as follows:

the valves are located at the ends of the major axis of the ellipse,
the plugs are located close to the minor axis of the ellipse,
the fuel injector is located on the periphery of the ellipse between the intake valve and a plug.

This elliptical design of the combustion chamber associated with this arrangement of the components allows to generate an aerodynamic swumble structure and to promote homogenization of the fuel mixture. Furthermore, it enables a high combustion rate while preventing autoignition phenomena.

SUMMARY OF THE INVENTION

The invention relates to a combustion chamber of an internal-combustion engine comprising at least one cylinder in which a piston moves, said combustion chamber comprising a single intake valve, a single exhaust valve, a single fuel injector and two plugs. Said combustion chamber substantially has the shape of an ellipse, said intake valve and said exhaust valve are arranged at the ends of the major axis of said ellipse, said plugs are located close to the minor axis of said ellipse and said fuel injector is located inside the ellipse, close to the periphery of the ellipse between said intake valve and a plug.

According to an embodiment of the invention, said ellipse comprises a recess extending towards said intake valve and arranged substantially symmetrically to said fuel injector with respect to the semi-major axis.

Advantageously, said recess is substantially rectilinear.

According to an implementation, said intake valve is tangential to said ellipse.

According to an aspect of the invention, said exhaust valve is tangential to said ellipse.

According to a characteristic, the ratio of the diameter of said intake valve to the diameter of said exhaust valve ranges between 1 and 3, preferably between 1.5 and 2, and more preferably between 1.65 and 1.75.

Advantageously, the length of the semi-major axis of said ellipse is substantially equal to the radius of said cylinder of said combustion engine.

Preferably, the length of the semi-minor axis of said ellipse ranges between 70 and 90%, preferably between 75 and 85%, of the radius of said cylinder of said combustion engine.

Furthermore, the invention relates to an internal-combustion engine comprising at least one cylinder in which a piston slides and a combustion chamber according to one of the above characteristics.

According to an embodiment of the invention, said combustion engine comprises a gas intake pipe configured to initiate a rotating motion of the air about the cylinder axis and a rotating motion about an axis perpendicular to the axis of said cylinder.

Furthermore, the invention relates to a use of an internal-combustion engine according to one of the above characteristics with a Miller cycle.

BRIEF DESCRIPTION OF THE FIGURES

Other features and advantages of the device according to the invention will be clear from reading the description hereafter, given by way of non limitative example, with reference to the accompanying figures wherein.

DETAILED DESCRIPTION OF THE INVENTION

Figure 1:
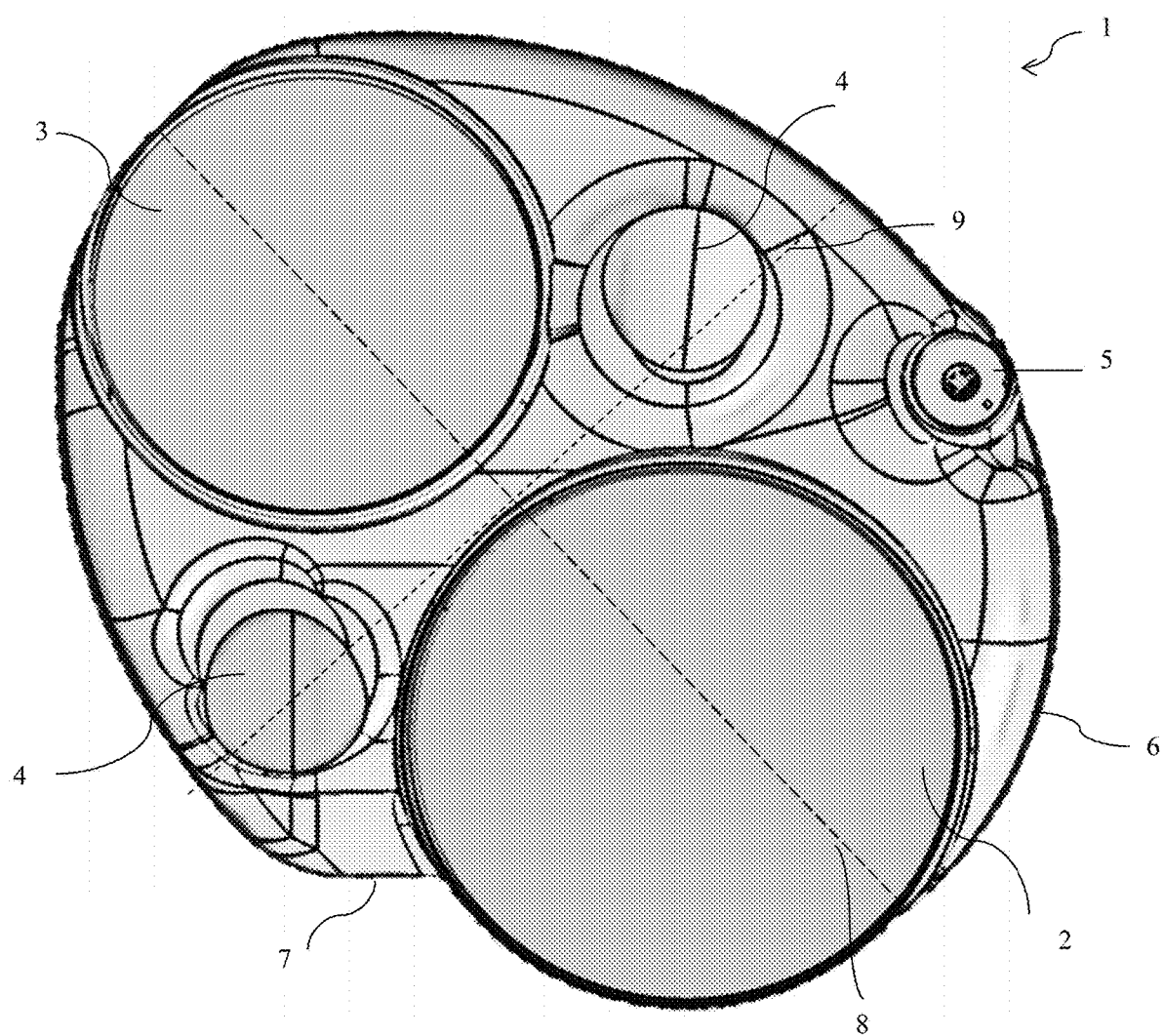
FIG. 1 illustrates a combustion chamber according to an embodiment of the invention.

The present invention relates to a combustion chamber for an internal-combustion engine. The internal-combustion engine comprises at least one cylinder in which a piston moves.

According to the invention, the combustion chamber comprises:
  a single intake valve, allowing delivery of the gas mixture to the combustion chamber before the combustion phase,
  a single exhaust valve, allowing discharge of the burnt gas after the combustion phase,
  a single fuel injector, allowing direct injection of the fuel into the combustion chamber, and
  two plugs, allowing ignition of the gas/fuel mixture in the combustion chamber.

The gas mixture can comprise supercharged air or not, or a mixture of air, supercharged or not, with recirculated burnt gas.

The fuel can notably be gasoline or diesel fuel.

Using only two valves (one for the intake and the other for the exhaust) involves several design advantages. Indeed, such an engine is less expensive (with a limited number of parts), lighter and more compact. Furthermore, this design provides more space for the plugs and the injector.

Using a single intake valve facilitates the creation of swumble. Indeed, it is more difficult to create swumble with two dispensing intake pipes.

According to the invention, the combustion chamber substantially has the shape of an ellipse. This shape promotes considerable squish. Indeed, the ratio of the surface area of this ellipse to the surface area of a section of the cylinder is particularly small, which corresponds to a great squish.

In order to promote swumble and squish, the components of the combustion chamber are arranged in a specific manner:
  the intake valve and the exhaust valve are arranged at the ends of the major axis of the ellipse, thus the valves are positioned opposite one another and spaced apart,
  the plugs are arranged close to the minor axis of the ellipse, thus the plugs are located between the intake valve and the exhaust valve, and
  the fuel injector is arranged on the periphery of the ellipse between the intake valve and a plug, this location promoting mixing of the gas and the fuel thanks to the swumble motion.

This elliptical design of the combustion chamber associated with this arrangement of the components allows to generate an aerodynamic swumble structure and to promote homogenization of the fuel mixture. Furthermore, it enables a high combustion rate while preventing autoignition phenomena. Indeed, it is reminded that swumble allows to benefit from excellent homogenization and a better combustion rate thanks to a higher turbulence level during the intake phase than those observed with the best current spark-ignition engines.

According to an embodiment of the invention, the ellipse can comprise a recess extending towards the intake valve. The recess is arranged substantially symmetrically to the fuel injector with respect to the major axis. In other words, the recess is on the side of the intake valve opposite the side on which the fuel injector is positioned. The recess thus is located between a plug and the intake valve. A recess is understood to be a modification in the outer shape of the ellipse, this modification being achieved towards the inside of the ellipse. The recess enables swirl type turbulences to be intensified. Indeed, the purpose of the recess is to promote the formation of the swirl part of the swumble motion. This recess creates an extension of the pipe in the chamber, which provides continuation of the aerodynamic structure formation.

Advantageously, the recess can have a substantially rectilinear shape. For example, the rectilinear recess can be achieved with fillet radii ranging between 2 and 10 mm, preferably between 4 and 6 mm.

According to an embodiment of the invention, the intake valve can be tangential to the ellipse. Thus, filling of the combustion chamber is optimized.

According to a characteristic of the invention, the exhaust valve can be tangential to the ellipse. Thus, emptying of the combustion chamber is optimized.

According to an embodiment of the invention, the ratio of the diameter of the intake valve to the exhaust valve can range between 1 and 3, preferably between 1.5 and 2, and more preferably between 1.65 and 1.75. Such a ratio provides the best compromise between engine performances (related to the amount of air admitted) and sufficient engine drain capacity.

According to an embodiment of the invention, the length of the semi-major axis of the ellipse can be substantially equal to the radius of the cylinder of the combustion engine. Thus, the greater dimension of the ellipse substantially corresponds to the diameter of the cylinder, which allows the volume to be optimized for the combustion chamber.

According to an implementation of the invention, the length of the semi-minor axis of the ellipse can range between 70 and 90%, preferably between 75 and 85%, of the radius of the cylinder of the combustion engine.

According to a configuration of the invention, the plugs are not positioned on the periphery of the ellipse. This arrangement of the plugs provides optimal propagation of the flame front in order to prevent engine knock and unburnt gas.

Furthermore, the combustion chamber can be designed to withstand compression ratios ranging between 6:1 and 22:1, preferably between 10:1 and 20:1, and more preferably between 14:1 and 18:1.

FIG. 1 schematically illustrates, by way of non limitative example, a combustion chamber 1 according to an embodiment of the invention. Combustion chamber 1 substantially has the shape of an ellipse 6. Ellipse 6 is defined by the major axis 8 and the minor axis 9 thereof. Combustion chamber 1 comprises a single intake valve 2 located at one end of a semi-major axis 8. Intake valve 2 is tangential to ellipse 6. Combustion chamber 1 comprises a single exhaust valve 3 located at one end of a semi-major axis 8. This end lies opposite the end on which intake valve 2 is positioned. Exhaust valve 3 is tangential to ellipse 6. Combustion chamber 1 further comprises two plugs 4. Plugs 4 are substantially arranged on minor axis 9 (close to minor axis 9). Furthermore, combustion chamber 1 comprises a single fuel injector 5. Fuel injector 5 is positioned on the periphery of ellipse 6. Besides, fuel injector 5 is located between intake valve 2 and a plug 4. On the side opposite to injector 5, ellipse 6 comprises a rectilinear recess 7. Rectilinear recess 7 is positioned between a plug 4 and intake valve 2. Rectilinear recess 7 extends towards intake valve 2.

In addition to promoting squish, elliptical shape 6 as presented also promotes the development of the swirl motion that starts in the intake pipe. This chamber is somehow the extension thereof.

The present invention also relates to an internal-combustion engine comprising:
 at least one cylinder in which the piston moves,
 a combustion chamber associated with the cylinder, the combustion chamber being achieved according to any one of the variants or according to any one of the combinations of variants described above.

According to an aspect of the invention, the internal-combustion engine comprises between one and eight cylinders. For example, the combustion engine can comprise two, three or four cylinders.

According to a characteristic of the invention, the combustion engine can comprise a burnt gas recirculation circuit (EGR).

According to an embodiment of the invention, the combustion engine can comprise an air intake pipe connected to the combustion chamber, in which the intake valve is positioned, configured to initiate a swumble motion, i.e. a rotating motion of the air about the cylinder axis (tumble) and a rotating motion about an axis perpendicular to the cylinder axis (swirl).

The invention relates to a combustion chamber specifically designed to obtain a higher combustion rate than the current spark-ignition engines and thus to provide better combustion efficiency.

In particular, said combustion chamber according to the invention is particularly suited for use with a so-called Miller cycle over a wide operating range. This cycle is characterized by an intake valve(s) closure before the bottom dead center of the piston. This allows to have increased work recovery, in addition to cooling of the charge admitted.

Such a combustion engine can be used in the field of transport, road or air transport for example, or in the field of stationary installations such as a generator set.

APPLICATION EXAMPLE

The features and advantages of the combustion chamber according to the invention will be clear from reading the application example below.

Figure 2:
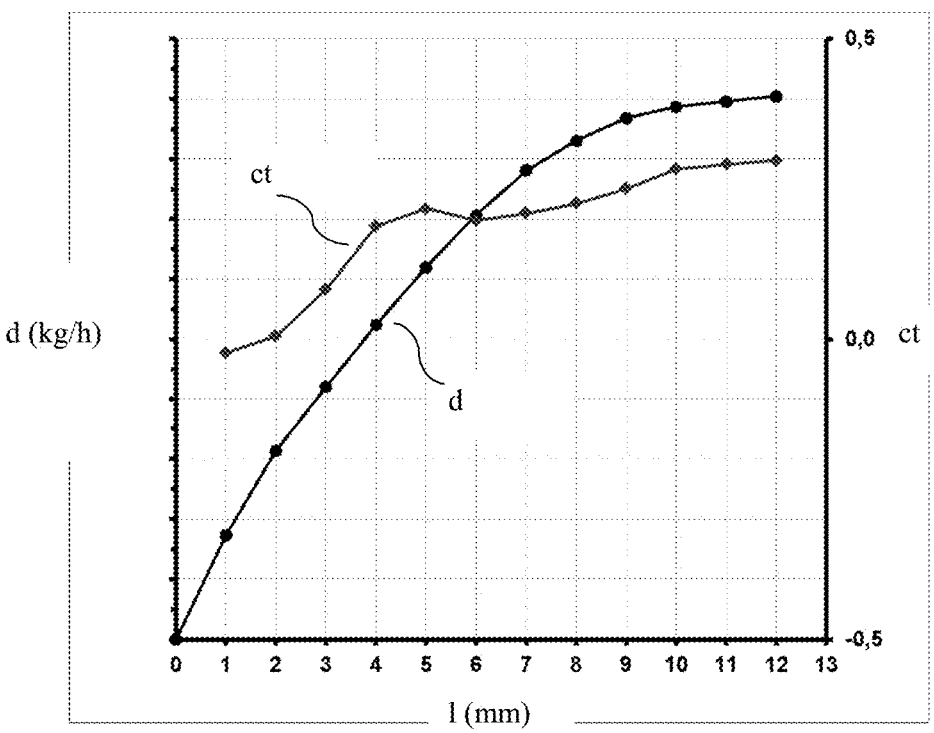
FIG. 2 illustrates the evolution of the tumble ratio as a function of the intake valve lift for a combustion chamber according to the invention.
Figure 3:
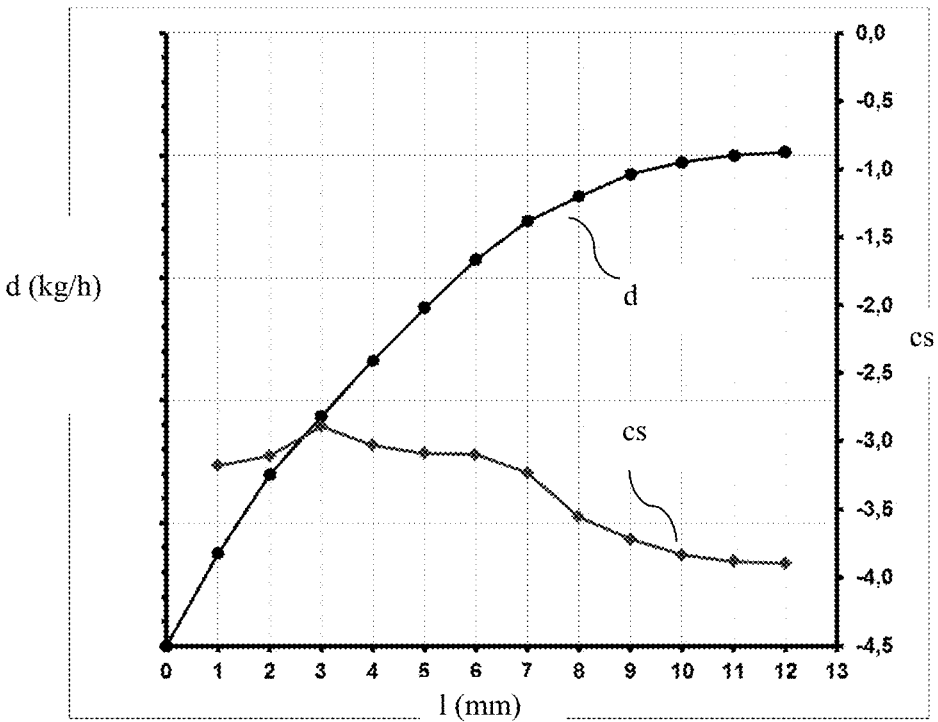
FIG. 3 illustrates the evolution of the swirl ratio as a function of the intake valve lift for a combustion chamber according to the invention.

The present invention was evaluated and compared with the current spark-ignition engines. FIGS. 2 and 3 respectively show the evolution of the tumble ratio and of the swirl coefficient for a combustion chamber according to the invention.

FIG. 2 illustrates the evolution of tumble coefficient ct as a function of the lift l, in mm, of the intake valve. FIG. 2 also shows the flow rate d in kg/h of the gas through the intake valve. It can be seen that the tumble coefficient increases and remains high upon lift of the intake valve.

FIG. 3 illustrates the evolution of swirl coefficient cs as a function of the lift l, in mm, of the intake valve. FIG. 3 also shows the flow rate d in kg/h of the gas through the intake valve. It can be seen that the swirl coefficient remains high (in absolute value) upon lift of the intake valve. The combustion chamber according to the invention therefore enables a swumble motion.

Figure 4:
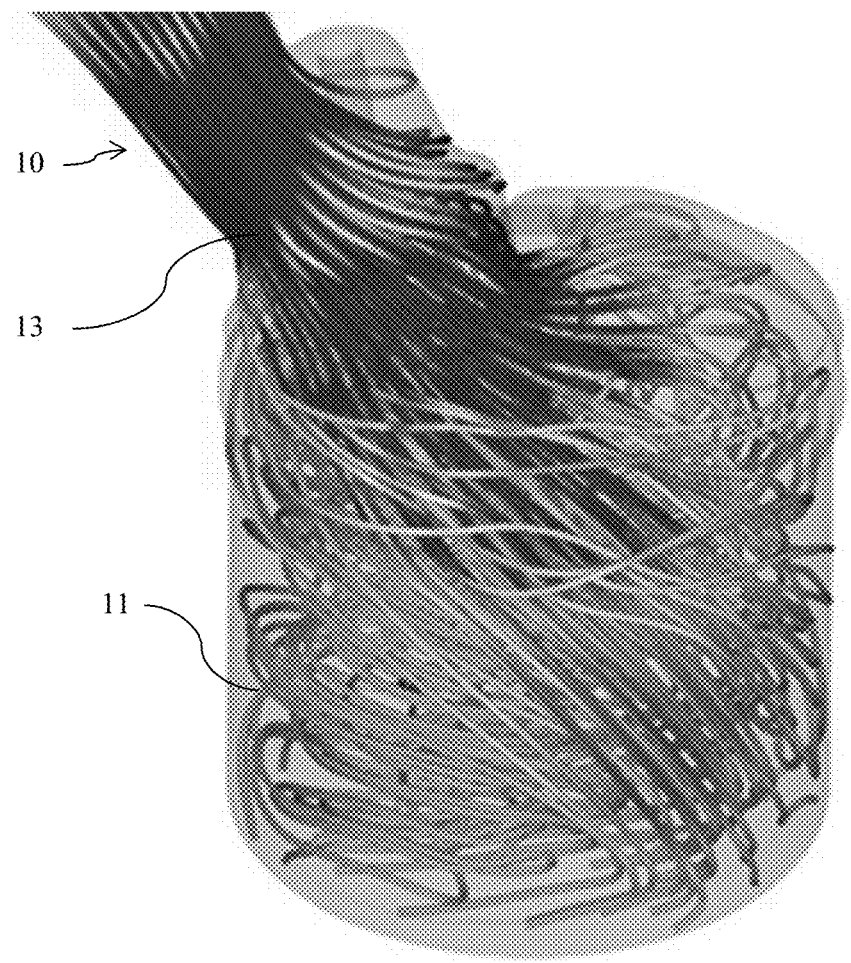
FIG. 4 illustrates the structure of the swumble formed in a cylinder by means of the combustion chamber according to the invention.

FIG. 4 schematically shows, by way of non limitative example, a graphic representation of the aerodynamic swumble structure within intake pipe 10 and cylinder 11, for an engine provided with a combustion chamber according to the invention. FIG. 4 illustrates various gas streams 13 in these elements.

It is also observed that the combustion duration is independent of the distribution law spread and calibration, which is not found in current spark-ignition engines. This enables the overall efficiency of the internal-combustion engine to be positively impacted.

Thus, the combustion chamber according to the invention enables a high swumble in the cylinder, which optimizes the efficiency of the combustion and therefore of the combustion engine.

The invention claimed is:

1. A combustion chamber of an internal-combustion engine comprising at least one cylinder in which a piston moves, the combustion chamber comprising a single intake valve, a single exhaust valve, a single fuel injector and two plugs, wherein the combustion chamber substantially has the shape of an ellipse having a major axis and a minor axis shorter than the major axis, the intake valve and the exhaust valve are arranged at ends of the major axis of the ellipse, the plugs are located close to the minor axis of the ellipse and the fuel injector is located inside the ellipse, closer to a periphery of ellipse than to a center of the ellipse and between the intake valve and one of the two plugs, and wherein the ellipse comprises a recess extending towards the intake valve and arranged substantially symmetrically to the fuel injector with respect to the major axis of the ellipse.

2. A combustion chamber as claimed in claim 1, wherein the recess is substantially rectilinear.

3. A combustion chamber as claimed in claim 1, wherein the intake valve is tangential to the ellipse.

4. A combustion chamber as claimed in claim 1, wherein the exhaust valve is tangential to the ellipse.

5. A combustion chamber as claimed in claim 1, wherein the ratio of the diameter of the intake valve to the diameter of the exhaust valve ranges between 1 and 3.

6. A combustion chamber as claimed in claim 1, wherein the length of the major axis of the ellipse is substantially equal to the radius of the cylinder of the combustion engine.

7. A combustion chamber as claimed in claim 1, wherein the length of the minor axis of the ellipse ranges between 70 and 90% of the radius of the cylinder of the combustion engine.

8. An internal-combustion engine comprising at least one cylinder in which a piston slides and a combustion chamber as claimed in claim 1.

9. A combustion engine as claimed in claim 8, wherein the combustion engine comprises a gas intake pipe configured to initiate a rotating motion of the air about the axis of cylinder and a rotating motion about an axis perpendicular to the axis of the cylinder.

10. Use of a combustion engine as claimed in claim 8 with a Miller cycle.

11. A method of using the combustion engine as claimed in claim 8, comprising operating the combustion engine in a Miller cycle in which the intake valve closes before bottom dead center of the piston.

12. A combustion chamber as claimed in claim 1, wherein the ratio of the diameter of the intake valve to the diameter of the exhaust valve ranges between 1.5 and 2.

13. A combustion chamber as claimed in claim 1, wherein the ratio of the diameter of the intake valve to the diameter of the exhaust valve ranges between 1.65 and 1.75.

14. A combustion chamber as claimed in claim 1, wherein the length of the minor axis of the ellipse ranges between 75 and 85% of the radius of the cylinder of the combustion engine.

\* \* \* \* \*